US012785780B2

(12) United States Patent
Kuang et al.

(10) Patent No.: US 12,785,780 B2
(45) Date of Patent: Nov. 3, 2026

(54) USER EQUIPMENT AND SCHEDULING NODE

(71) Applicant: Panasonic Intellectual Property Corporation of America, Torrance, CA (US)

(72) Inventors: Quan Kuang, Langen (DE); Ayako Horiuchi, Kanagawa (JP); Hidetoshi Suzuki, Kanagawa (JP)

(73) Assignee: Panasonic Intellectual Property Corporaton of America, Torrance, CA (US)

( * ) Notice: Subject to any disclaimer, the term of this patent is extended or adjusted under 35 U.S.C. 154(b) by 376 days.

(21) Appl. No.: 18/553,172

(22) PCT Filed: Feb. 8, 2022

(86) PCT No.: PCT/EP2022/052932
§ 371 (c)(1),
(2) Date: Sep. 28, 2023

(87) PCT Pub. No.: WO2022/207167
PCT Pub. Date: Oct. 6, 2022

(65) Prior Publication Data

US 2024/0187075 A1 Jun. 6, 2024

(30) Foreign Application Priority Data

Mar. 30, 2021 (EP) .................................... 21166044

(51) Int. Cl.
*H04B 7/06* (2006.01)

(52) U.S. Cl.
CPC ................................ *H04B 7/06952* (2023.05)

(58) Field of Classification Search
CPC ... H04L 5/0048; H04B 7/069; H04B 7/06952; H04W 48/12; H04W 48/16
See application file for complete search history.

(56) References Cited

U.S. PATENT DOCUMENTS

| | | | | |
|---|---|---|---|---|
| 10,812,125 | B1 * | 10/2020 | Badic ................ | H04W 72/0446 |
| 11,871,243 | B2 * | 1/2024 | Sengupta ............ | H04L 27/2613 |
| 2020/0413412 | A1 | 12/2020 | Kim et al. | |

FOREIGN PATENT DOCUMENTS

| | | | |
|---|---|---|---|
| JP | 2020043567 | A | 3/2020 |
| WO | 2019160947 | A1 | 8/2019 |
| WO | 2021029159 | A1 | 2/2021 |

OTHER PUBLICATIONS

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019. (99 pages).

(Continued)

*Primary Examiner* — Diane D Mizrahi
(74) *Attorney, Agent, or Firm* — Seed Intellectual Property Law Group LLP

(57) ABSTRACT

Provided are a UE, a scheduling node, and methods for a UE and for a scheduling node. The UE comprises circuitry which, in operation, monitors a first time or frequency resource for a first physical downlink control channel (PDCCH) on a first beam, and a transceiver which, in operation, receives a signal initiating switching from the first beam to a second beam, wherein the circuitry, in operation, at a timing of switching to the second beam, switches to a second time or frequency resource to be monitored for a second PDCCH on the second beam based on the signal and an indication of the second time or frequency resource, and wherein the first and the second PDCCHs are specific to the UE or to respective groups of UEs comprising the UE.

12 Claims, 10 Drawing Sheets

(56) References Cited

OTHER PUBLICATIONS

3GPP, "3rd Generation Partnership Project; Technical Specification Group Radio Access Network; NR; Physical channels and modulation (Release 15)," 3GPP TS 38.211 V15.3.0, Sep. 2018. (96 pages).
3GPP, "3rd Generation Partnership Project; Technical Specification Group Radio Access Network; NR; Physical channels and modulation (Release 15)," 3GPP TS 38.211 V15.6.0, Jun. 2019. (97 pages).
3GPP, "3rd Generation Partnership Project; Technical Specification Group Radio Access Network; Study on Scenarios and Requirements for Next Generation Access Technologies; (Release 16)," 3GPP TR 38.913 v16.0.0, Jul. 2020. (40 pages).
3GPP, "3rd Generation Partnership Project; Technical Specification Group Services and System Aspects; System Architecture for the 5G System; Stage 2 (Release 16)," 3GPP TS 23.501 v16.1.0, Jun. 2019. (368 pages).
Extended European Search Report, dated Sep. 17, 2021, for European Patent Application No. 21166044.4-1212. (13 pages).
Intel Corporation, "On CORESETs and search spaces," R1-1716306, Agenda item: 6.3.1.2, 3GPP TSG RAN WG1 NR Adhoc#3, Nagoya, Japan, Sep. 18-21, 2017. (12 pages).
Intel Corporation, "PDCCH transmission schemes and multi-beam operation," R1-1707378, Agenda item: 7.1.3.1.1, 3GPP TSG RAN WG1 Meeting #89, Hangzhou, P.R. China, May 15-19, 2017. (3 pages).
InterDigital, Inc., "Remaining issues on beam management," R1-1720630, Agenda Item: 7.2.2.3, 3GPP TSG RAN WG1 Meeting #91, Reno, USA, Nov. 27-Dec. 1, 2017. (13 pages).
International Search Report, mailed May 30, 2022, for PCT Patent Application No. PCT/EP2022/052932. (4 pages).
ITU, "IMT Vision—Framework and overall objectives of the future development of IMT for 2020 and beyond," Recommendation ITU-R M.2083-0, Sep. 2015. (21 pages).
Nokia, Alcatel-Lucent Shanghai Bell, "Beam Recovery in NR," R1-1705961, Agenda item: 8.1.2.2.2, 3GPP TSG RAN WG1#88 bis, Spokane, WA, USA, Apr. 3-7, 2017. (7 pages).
Moderator (OPPO), "Email discussion summary for [97e][222] NR_CSIRS_L3meas_RRM_2," R4-2017033, Agenda item: 7.14.2.2, 3GPP TSG-RAN WG4 Meeting # 97-e, Electronic Meeting, Nov. 2-13, 2020. (17 pages).
Qualcomm Incorporated, "Control channel multi-beam operation," R1-1713420, Agenda item: 6.1.3.1.2.3, 3GPP TSG RAN WG1 #90, Prague, Czech Republic, Aug. 21-25, 2017. (6 pages).

* cited by examiner

USER EQUIPMENT AND SCHEDULING NODE

BACKGROUND

Technical Field

The present disclosure relates to transmission and reception of signals in a communication system. In particular, the present disclosure relates to methods and apparatuses for such transmission and reception.

Description of the Related Art

The 3rd Generation Partnership Project (3GPP) works at technical specifications for the next generation cellular technology, which is also called fifth generation (5G) including "New Radio" (NR) radio access technology (RAT), which operates in frequency ranges up to 100 GHz. The NR is a follower of the technology represented by Long Term Evolution (LTE) and LTE Advanced (LTE-A).

For systems like LTE, LTE-A, and NR, further modifications and options may facilitate efficient operation of the communication system as well as particular devices pertaining to the system.

BRIEF SUMMARY

One non-limiting and exemplary embodiment facilitates efficient switching of time and frequency resources for downlink control information when changing a serving beam.

In an embodiment, provided is a user equipment (UE) comprising circuitry which, in operation, monitors a first time or frequency resource for a first physical downlink control channel, PDCCH, on a first beam, and a transceiver which, in operation, receives a signal initiating switching from the first beam to a second beam, wherein the circuitry, in operation, at a timing of switching to the second beam, switches to a second time or frequency resource to be monitored for a second PDCCH on the second beam based on the signal and an indication of the second time or frequency resource, and wherein the first and the second PDCCHs are specific to the UE or to respective groups of UEs comprising the UE.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

DETAILED DESCRIPTION

5G NR System Architecture and Protocol Stacks

3GPP has been working at the next release for the 5$^{th}$ generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
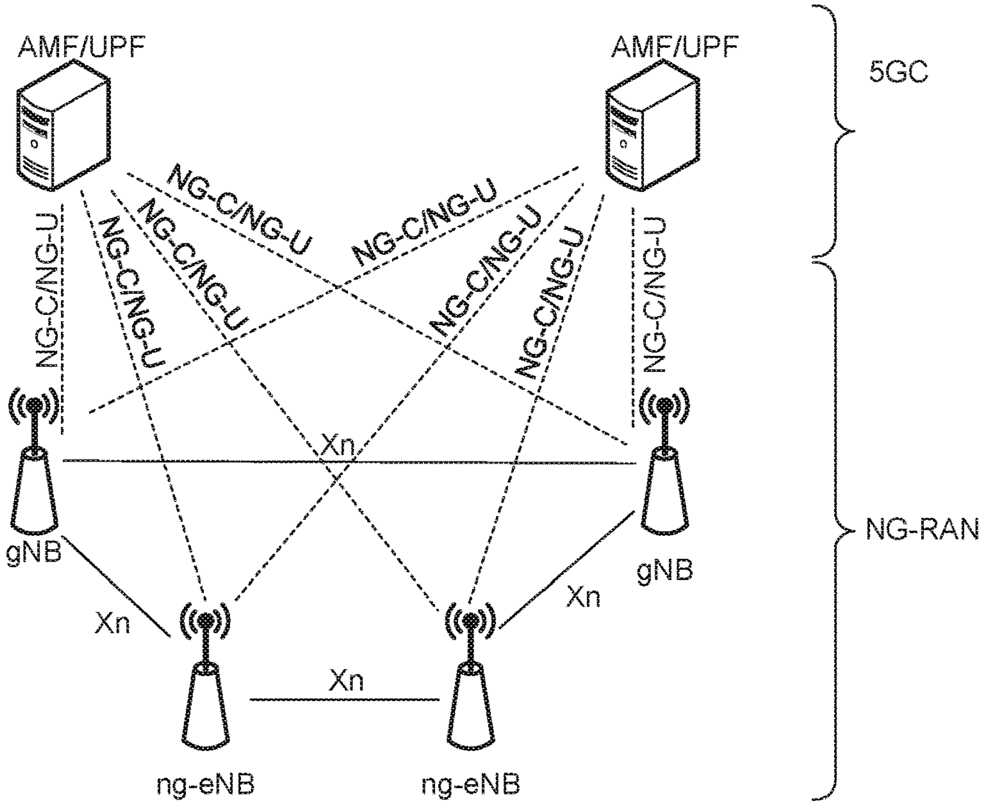
FIG. 1 shows an exemplary architecture for a 3GPP NR system.

Among other things, the overall system architecture assumes an NG-RAN (Next Generation-Radio Access Network) that comprises gNBs (gNodeB), providing the NG-radio access user plane (SDAP/PDCP/RLC/MAC/PHY) and control plane (RRC, Radio Resource Control) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.6.0, section 4).

The user plane protocol stack for NR (see, e.g., 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are PRACH (Physical Random Access Channel), PUSCH (Physical Uplink Shared Channel) and PUCCH (Physical Uplink Control Channel) for uplink and PDSCH (Physical Downlink Shared Channel), PDCCH (Physical Downlink Control Channel) and PBCH (Physical Broadcast Channel) for downlink.

Use cases/deployment scenarios for NR could include enhanced mobile broadband (eMBB), ultra-reliable low-latency communications (URLLC), and/or massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability ($1\text{-}10^{-5}$ within 1 ms). Finally, mMTC may preferably require high connection density (1,000,000 devices/$km^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing Δf are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

5G NR Functional Split Between NG-RAN and 5GC

Figure 2:
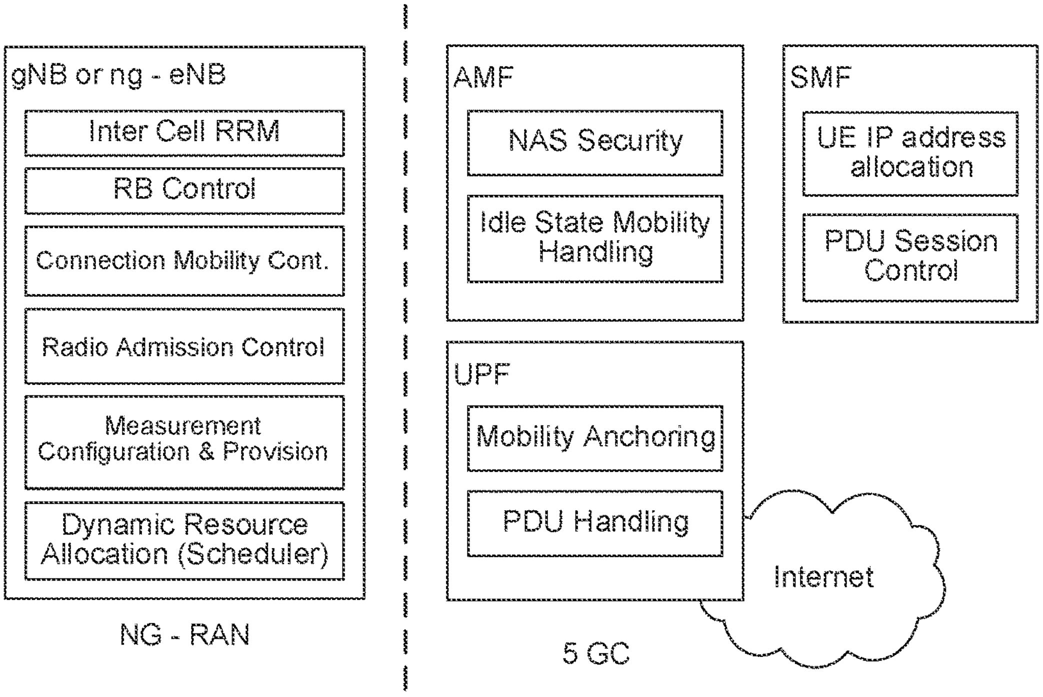
FIG. 2 is a schematic drawing which shows functional split between NG-RAN and 5GC.

FIG. 2 illustrates functional split between NG-RAN and 5GC. NG-RAN logical node is a gNB or ng-eNB (next generation eNB). The 5GC has logical nodes AMF, UPF and SMF.

In particular, the gNB and ng-eNB host the following main functions:

- Functions for Radio Resource Management such as Radio Bearer Control, Radio Admission Control, Connection Mobility Control, Dynamic allocation of resources to UEs in both uplink and downlink (scheduling);
- IP header compression, encryption and integrity protection of data;
- Selection of an AMF at UE attachment when no routing to an AMF can be determined from the information provided by the UE;
- Routing of User Plane data towards UPF(s);
- Routing of Control Plane information towards AMF;
- Connection setup and release;
- Scheduling and transmission of paging messages;
- Scheduling and transmission of system broadcast information (originated from the AMF or OAM);
- Measurement and measurement reporting configuration for mobility and scheduling;
- Transport level packet marking in the uplink;
- Session Management;
- Support of Network Slicing;
- QoS Flow management and mapping to data radio bearers;
- Support of UEs in RRC_INACTIVE state;
- Distribution function for NAS (Non-access stratum) messages;
- Radio access network sharing;
- Dual Connectivity;
- Tight interworking between NR and E-UTRA.

The Access and Mobility Management Function (AMF) hosts the following main functions:

- Non-Access Stratum, NAS, signaling termination;
- NAS signaling security;
- Access Stratum, AS, Security control;
- Inter Core Network, CN, node signaling for mobility between 3GPP access networks;
- Idle mode UE Reachability (including control and execution of paging retransmission);
- Registration Area management;
- Support of intra-system and inter-system mobility;
- Access Authentication;
- Access Authorization including check of roaming rights;
- Mobility management control (subscription and policies);
- Support of Network Slicing;
- Session Management Function, SMF, selection.

Furthermore, the User Plane Function, UPF, hosts the following main functions:

- Anchor point for Intra-/Inter-RAT mobility (when applicable);
- External PDU session point of interconnect to Data Network;
- Packet routing & forwarding;
- Packet inspection and User plane part of Policy rule enforcement;
- Traffic usage reporting;
- Uplink classifier to support routing traffic flows to a data network;
- Branching point to support multi-homed PDU session;
- QoS handling for user plane, e.g., packet filtering, gating, UL/DL rate enforcement;
- Uplink Traffic verification (SDF to QoS flow mapping);

Downlink packet buffering and downlink data notification triggering.

Finally, the Session Management function, SMF, hosts the following main functions:

- Session Management;
- UE IP address allocation and management;
- Selection and control of UP function;
- Configures traffic steering at User Plane Function, UPF, to route traffic to proper destination;
- Control part of policy enforcement and QoS;
- Downlink Data Notification.

RRC Connection Setup and Reconfiguration Procedures

Figure 3:
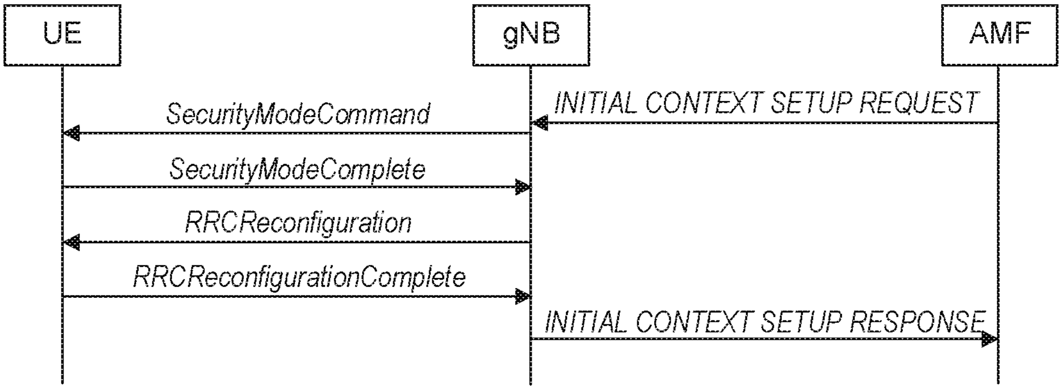
FIG. 3 is a sequence diagram for RRC connection setup/reconfiguration procedures.

FIG. 3 illustrates some interactions between a UE, gNB, and AMF (a 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. In particular, this transition involves that the AMF prepares the UE context data (including, e.g., PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signalling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and Beyond

Figure 4:
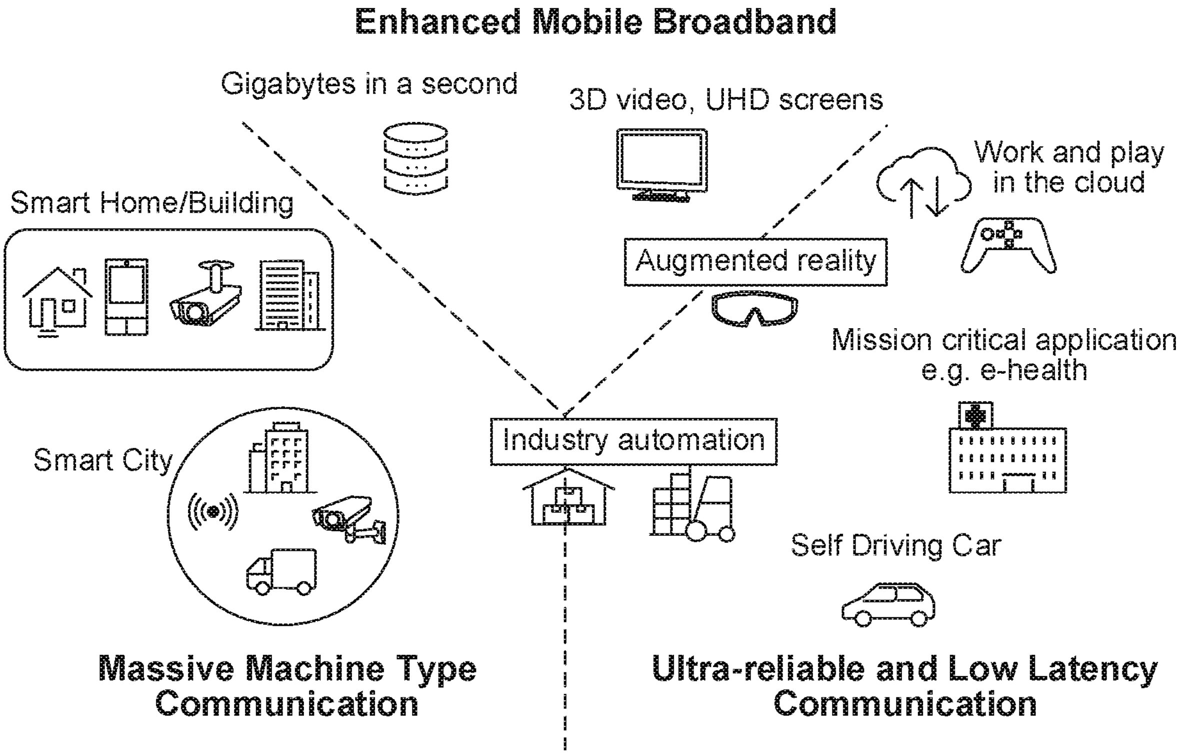
FIG. 4 is a schematic drawing showing usage scenarios of Enhanced mobile broadband (eMBB), Massive Machine Type Communications (mMTC) and Ultra Reliable and Low Latency Communications (URLLC)

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond (see, e.g., FIG. 2 of ITU-R M.2083).

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI (Downlink Control Information) formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to $10^{-6}$ level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLLC, several technology enhancements from the physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

In slot-based scheduling or assignment, a slot corresponds to the timing granularity (TTI—transmission time interval) for scheduling assignment. In general, TTI determines the timing granularity for scheduling assignment. One TTI is the time interval in which given signals is mapped to the physical layer. For instance, conventionally, the TTI length can vary from 14-symbols (slot-based scheduling) to 2-symbols (non-slot based scheduling). Downlink (DL) and uplink (UL) transmissions are specified to be organized into frames (10 ms duration) consisting of 10 subframes (1 ms duration). In slot-based transmission, a subframe is further divided into slots, the number of slots being defined by the numerology/subcarrier spacing. The specified values range between 10 slots per frame (1 slot per subframe) for a subcarrier spacing of 15 kHz to 80 slots per frame (8 slots per subframe) for a subcarrier spacing of 120 kHz. The number of OFDM symbols per slot is 14 for normal cyclic prefix and 12 for extended cyclic prefix (see section 4.1 (general frame structure), 4.2 (Numerologies), 4.3.1 (frames and subframes) and 4.3.2 (slots) of the 3GPP TS 38.211 V15.3.0, Physical channels and modulation, 2018-09). However, assignment of time resources for transmission may also be non-slot based. In particular, the TTIs in non slot-based assignment may correspond to mini-slots rather than slots, i.e., one or more mini-slots may be assign to a requested transmission of data/control signaling. In non slot-based assignment, the minimum length of a TTI may for instance be 1 or 2 OFDM symbols.

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g., as shown above with reference to FIG. 3. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
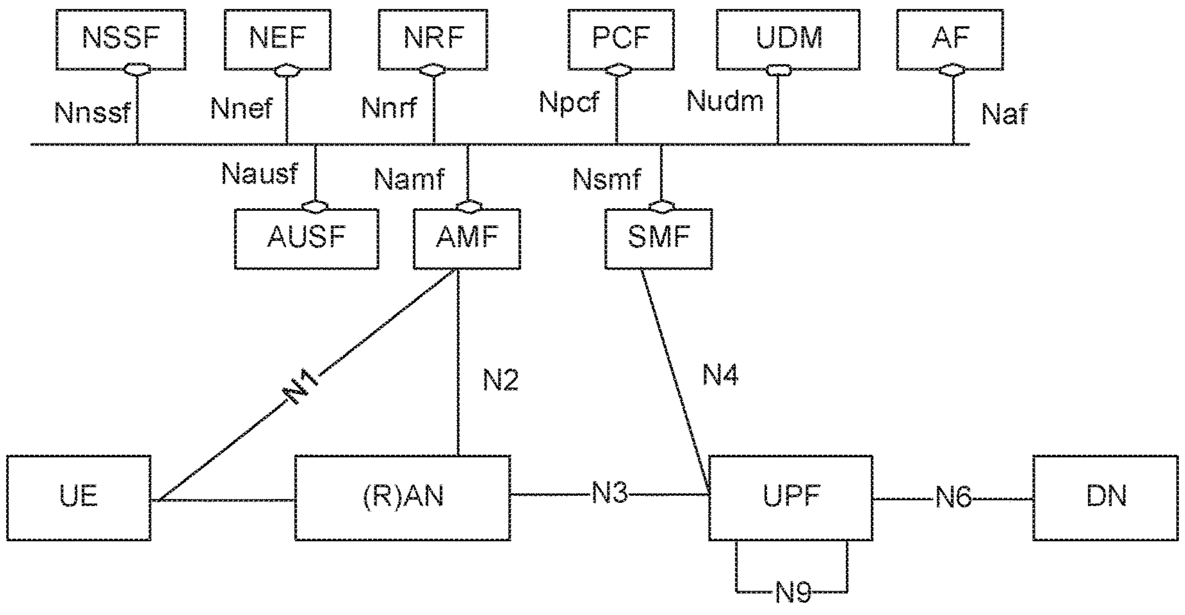
FIG. 5 is a block diagram showing an exemplary 5G system architecture for a non-roaming scenario.

FIG. 5 illustrates a 5G NR non-roaming reference architecture (see TS 23.501 v16.1.0, section 4.23). An Application Function (AF), e.g., an external application server hosting 5G services, exemplarily described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3$^{rd}$ party services. All of or a part of the core network functions and the application services may be deployed and running on cloud computing environments.

In the present disclosure, thus, an application server (for example, AF of the 5G architecture), is provided that comprises a transmitter, which, in operation, transmits a request containing a QoS requirement for at least one of URLLC, eMMB and mMTC services to at least one of functions (for example NEF, AMF, SMF, PCF, UPF, etc.) of the 5GC to establish a PDU session including a radio bearer between a gNodeB and a UE in accordance with the QoS requirement and control circuitry, which, in operation, performs the services using the established PDU session.

CORESET and Search Space

Physical Downlink Control Channel (PDCCH) is a physical layer (L1) channel for the downlink that carries downlink control information (DCI). In NR, a UE monitors (e.g., blindly decodes) PDCCH candidates in a control resource set (CORESET) using one or more search space(s) (SS). Accordingly, physical resources, over which the PDCCH is transmitted, are configured using CORESET and Search Space. Both CORESET and search space configurations are signaled semi-statically via RRC (Radio Resource Control) signaling using a SearchSpace information element (IE) and a ControlResourceSet IE. Each search space is associated with one CORESET The CORESET defines frequency resources (e.g., full chunks of 6 resource blocks (RBs) in a bandwidth part (BWP)) and the time duration (e.g., 1, 2, or 3 symbols) of the PDCCH candidates, among other configuration parameters.

The search space defines the PDCCH monitoring occasions in time (e.g., at which symbol of which slot or slots the UE starts monitoring PDCCH candidates), among other configuration parameters. The IE SearchSpace defines how and where to search for PDCCH candidates. A UE may be configured with a plurality of search spaces. Further, it is noted that search spaces are also referred to as search space sets.

In 3GPP, the concept of configuring two groups of search space sets (abbreviated as SSS or SS set) for monitoring of the PDCCH has been discussed. This concept has been specifically designed for operation in the unlicensed radio spectrum, where the gNB has to first acquire the channel in order to then be allowed to transmit a PDCCH.

A search space may be associated with a SSS group identified by a group ID. Accordingly, search spaces may be switched by referring to the group ID, e.g., to change the monitoring occasions or other parameters in unlicensed operation.

NR Multi-beam

NR provides for directional transmission using beamforming, where a base station or a transmission and reception point performs transmission and reception using directive beams. For instance, for NR operation on high frequencies (e.g., bands located above 52 GHz), directional transmission using beamforming may be used to concentrate the energy or transmit power to overcome the attenuation in these high frequency bands.

An example of multi-beam operation is TDM (Time-Division Multiplexing) transmission of beams, which may also be called beam sweeping. In TDM transmission of beams, the transmitter focusses the transmit power on one direction (beam) at one time instant. TDM may be performed in order to reach an intended coverage and/or as a result from hardware limitations, such as a transmitter being equipped with an analog beam-former. In order to avoid interference between the different beams, the different beams are each transmitted or generated in different symbols. Another example of multi-beam operation is FDM (Frequency-Division Multiplexing) transmission of beams, where the different beams are each transmitted over different frequency resources, e.g., bandwidth parts. Like the TDM of beams, FDM transmission of beams can also avoid interference between the different beams.

Figure 6:
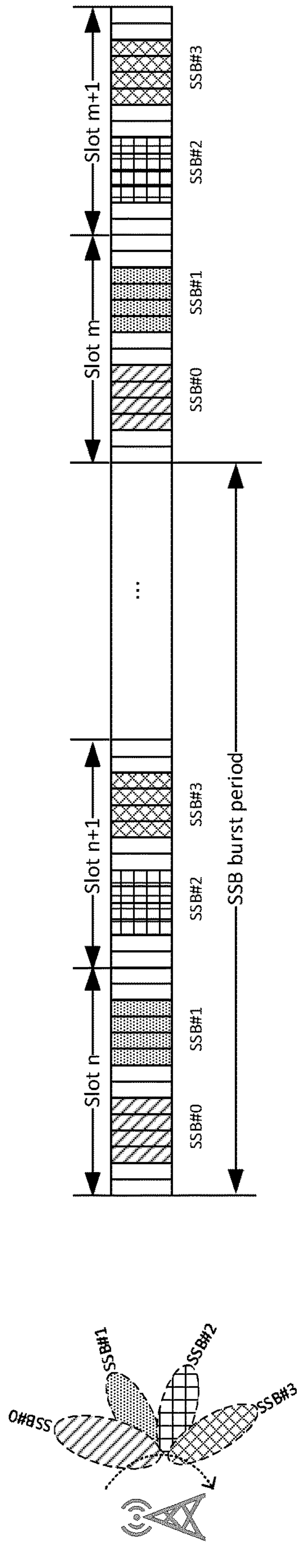
FIG. 6 illustrates Synchronization Signal Block transmission using beamforming.

An example of TDM beam operation for transmitting SSB (Synchronization Signal Block or SS block) is shown in FIG. 6. As shown, the SSBs are transmitted on each of a plurality of different beams in different non-overlapping and non-adjacent four-symbol time intervals across a SSB burst period of, e.g., 20 ms. Since the SSB carries the same information on each beam (except the beam index), the base station does not need to consider which UE is served by which beam.

Figure 7:
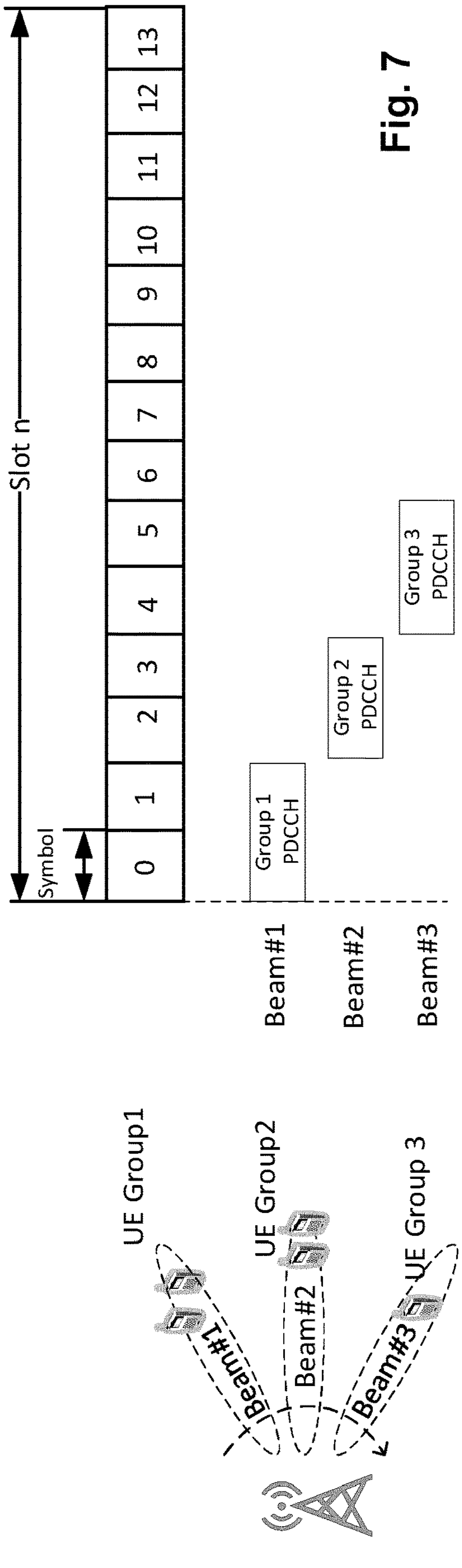
FIG. 7 illustrates transmission of group-common physical Downlink Control Channel (PDCCH) using beamforming.

However, TDM beam operation may also be used for transmitting a group-common PDCCH, e.g., DCI formats scrambled with RRC-configured Radio Network Temporary Identifiers (RNTI) such as SFI-RNTI (Slot Format Indication RNTI), INT-RNTI (Interruption RNTI), or PS-RNTI (Power Saving RNTI). For instance, as shown in FIG. 7 each beam may serve a group of UEs located in the direction of the same beam, and the group-common PDCCH carries dedicated control information for the respective groups of UEs and is thus specific to the group of UEs. In such a case, when a UE moves from one beam to another, the UE should also change the monitoring occasions accordingly.

Although the above example refers to a group common PDCCH carrying a group common DCI, which is specific to a group of UEs connected to the base station on the same beam, the present disclosure may also be applicable to UE specific PDCCHs.

In an exemplary mechanism of NR, the beam for transmitting the PDCCH by the gNB is indicated by a TCI (Transmission Configuration Indicator) state of the CORESET. The TCI state may be indicated via MAC (Medium Access Control) CE (control element) or via DCI. After receiving a new TCI state indication, the UE adjusts its Rx spatial filter according to the new beam at a pre-defined action timing (e.g., 3 ms after the UE has sent an ACK to the message carrying the MAC CE).

However, the UE then still monitors the PDCCH at the previous occasions corresponding to the previous beam or TCI state because changing the MO (monitoring occasion) requires separate RRC signaling to change, as a second-step, the search space configuration.

In the above-described mechanism the switching of the beam (e.g., informing UE of a new transmit beam from gNB) and the switching of PDCCH monitoring occasions are performed as two separate steps and are controlled by separate signals, namely the TCI state indication (e.g., via MAC CE or DCI) and separate RRC signaling for changing the MO(s).

Changes in the RRC configuration come into effect rather slowly. Therefore, with the above mechanism of beam switching and changing the PDCCH configuration, it may be difficult to meet requirements of fast beam adaptation, e.g., when operating at high frequencies.

Moreover, in the above mechanism of NR, the action timing of the RRC configuration is in most cases undefined, e.g., the timing when a RRC configuration comes into effect as soon as they are received correctly. This point in time may vary as it depends on whether RLC retransmissions were needed to deliver the RRC command or not, e.g., the UE changes the RRC configuration after successfully receiving the RRC configuration, which may be the case after only after one or more retransmission, resulting in an ambiguity of the RRC action timing. Such undefined switching timing may result in a possible mismatch between beam switching and switching timing of the monitoring occasion.

Furthermore, with the mechanism, every time beam switching happens, RRC signaling needs to be sent to the UE to change the monitoring occasions. Accordingly, the changing of the MO that is necessary due to beam switching brings about an increased signaling overhead.

The present disclosure provides efficient signaling to allow for changing the PDCCH monitoring occasions accordingly when the UE moves from one beam to another, e.g., techniques are provided for PDCCH monitoring adaptation for multi-beam operation.

A terminal is referred to in the LTE and NR as a user equipment (UE). This may be a mobile device or communication apparatus such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay.

A base station is a network node or scheduling node, e.g., forming a part of the network for providing services to terminals. A base station is a network node, which provides wireless access to terminals, e.g., a base station is referred to in NR as gNB.

Figure 8:
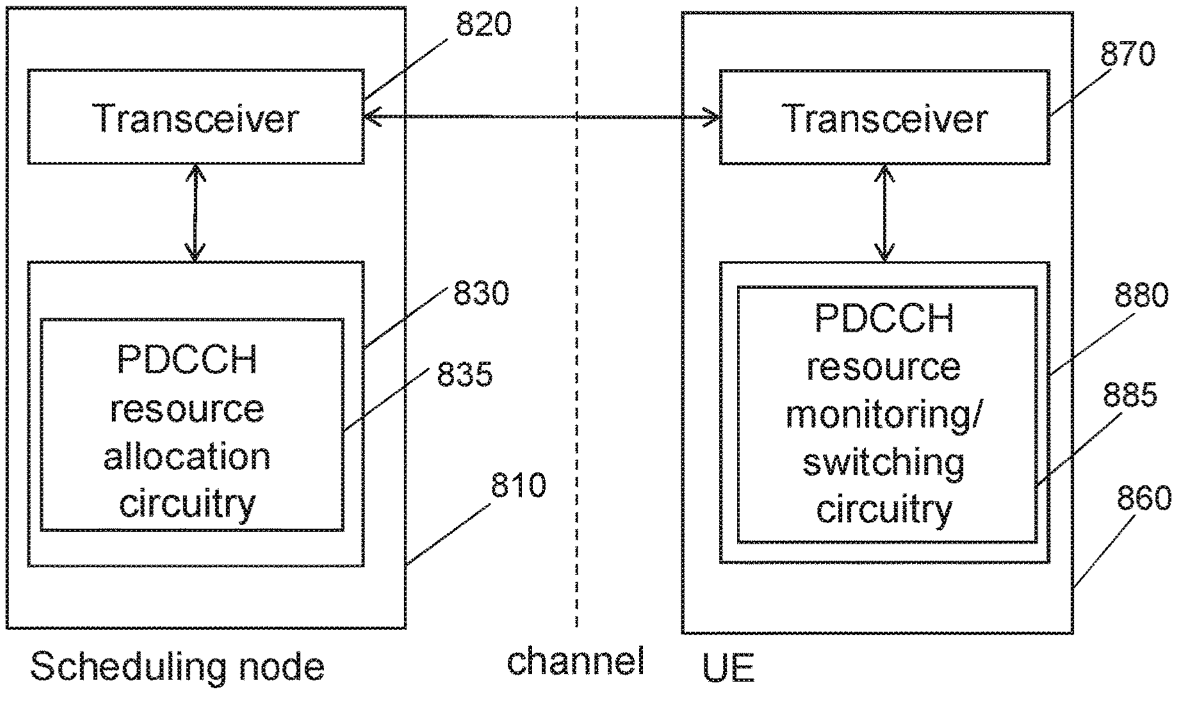
FIG. 8 is a block diagram illustrating a scheduling node and a user equipment.

The present disclosure provides a user equipment (UE) 860 comprising a transceiver 870 and circuitry 880, which is shown in FIG. 8. The circuitry 880 (or “UE circuitry”) monitors a first time or frequency resource for a first physical downlink channel on a first beam. The transceiver 870 (or “UE transceiver”), in operation, receives a signal initiating switching from a first beam to a second beam. At a timing of the switching to the second beam, the UE circuitry 880, in operation, switches to a second time or frequency resource to be monitored for a second PDCCH on the second beam based on the signal initiating the switching, and based on an indication of the second time or frequency resource. The first and the second PDCCHs are specific to the UE or to respective groups of UEs comprising the UE 860.

Figure 9:
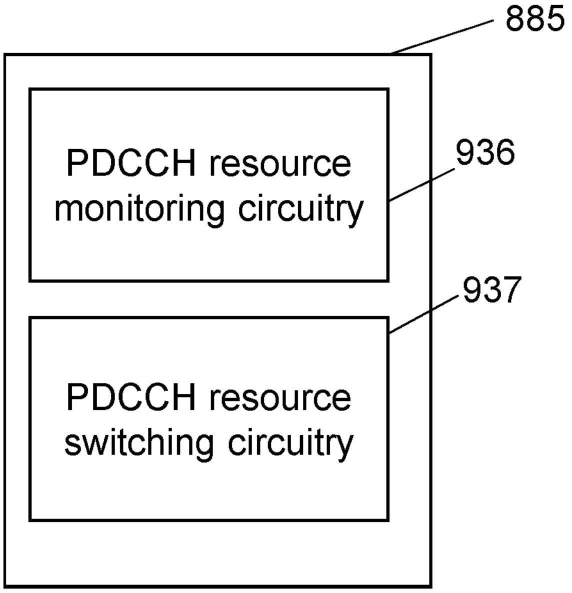
FIG. 9 is a block diagram illustrating PDCCH resource monitoring and switching circuitry of a UE.

For instance, the UE circuitry 880 comprises PDCCH resource monitoring and switching circuitry 885. Exemplary PDCCH resource monitoring and switching circuitry 885 is shown in FIG. 9, comprising PDCCH resource monitoring circuitry 936 which, in operation, monitors the first time or frequency resource for the PDCCH, and which monitors the second time or frequency resource for the second PDCCH, and comprising PDCCH resource switching circuitry 937, which performs the switching to the second time or frequency resource when switching to the second beam.

Further provided, and also shown in FIG. 8 is a scheduling node 810, comprising a transceiver 820 (or "SN transceiver") and circuitry 830 (or "SN circuitry"). The SN circuitry 830, in operation, allocates a first PDCCH to a first time or frequency resource when serving a UE on a first beam, in accordance with an association between a plurality of beams including the first beam and corresponding time or frequency resources. The SN transceiver 820, in operation, transmits a signal initiating switching of the UE to a second beam out of the plurality of beams. The SN circuitry 830, in operation, allocates a second PDCCH to a second time or frequency resource in accordance with the association between the plurality of beams and the corresponding time or frequency resources when serving the UE on the second beam. The first and the second PDCCH are specific to the UE or to respective groups of UEs comprising the UE.

For instance, the SN circuitry 830 comprises PDCCH resource allocation circuitry 835 which, in operation, allocates PDCCHs to time or frequency resources, e.g., allocates the first and the second PDCCH to the first and, respectively, the second time or frequency resource.

When the SN circuitry 830 allocates PDCCHs to time or frequency resources, it takes the timing of UE beam switching into consideration. The scheduling node 810 shall allocate the PDCCH so as to make sure that the timing for the UE to receive PDCCH on the second time or frequency resource is no sooner than the timing when UE has accomplished the beam switching to the second beam in view of the propagation delays of the transmitted signals. In the allocation, the scheduling node shall also ensure that the UE receives a last PDCCH on the first time or frequency resource no later than the timing when the UE has started the adjustments for beam switching to the second beam.

The scheduling node 810 and the UE 860 communicate over a wireless channel, which is implemented by a plurality of beams.

Figure 10:
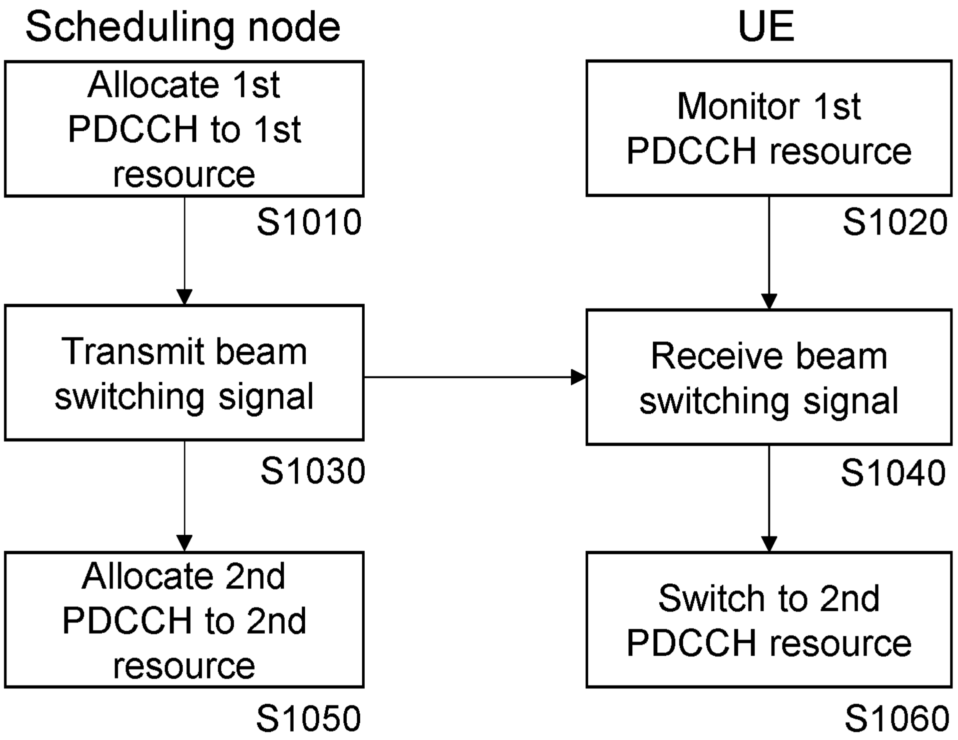
FIGS. 10 and 11 are flow charts illustrating method steps of a communication method for a scheduling node and a user equipment.

In correspondence with the above-described UE 860 and scheduling node, 810, provided is a communication method for a UE and a communication method for a base station, the steps of which are shown in FIG. 10.

The UE method comprises a step S1020 of monitoring a first time or frequency resource for a first PDCCH on a first beam. In step S1040, the UE receives a signal initiating switching from the first beam to a second beam. As shown in FIG. 10, the signal is received from a scheduling node (or one or more TRPs controlled by the scheduling node). Then, at a timing of switching to the second beam, the UE switches, step S1060, to a second time or frequency resource to be monitored for a second PDCCH on the second beam. In step S1060, the switching is performed based on the signal and an indication of the second time or frequency resource. In the UE method, the first PDCCH and the second PDCCH are UE-specific PDCCHs or group-specific PDCCHs specific to groups including the UE.

The method for the scheduling node comprises allocating, step S1010, a first PDCCH to a first time or frequency resource when serving a UE on a first beam. The method further comprises step S1030 of transmitting a beam switching signal initiating switching of the UE to a second beam. The method further comprises step S1050 of allocating a second PDCCH to a second time or frequency resource. Steps S1010 and S1050 of allocating PDCCHs to respective resources are performed based on and in accordance with an association between a plurality of beams and corresponding time or frequency resources, e.g., an association or linkage between the first beam and the time or frequency resource and an association between the second beam and the second time or frequency resource. In the method for the scheduling node, the first PDCCH and the second PDCCH are UE-specific PDCCHs or group-specific PDCCHs specific to groups including the UE.

When the scheduling node allocates PDCCHs to time or frequency resources, it takes the timing of UE beam switching into consideration. For example, the step S1050 shall make sure that the timing for UE to receive PDCCH on the second time or frequency resource is no sooner than the timing when UE has accomplished the beam switching to the second beam in view of the propagation delays of the transmitted signals. Step 1050 shall also ensure that the UE receives a last PDCCH on the first time or frequency resource no later than the timing when the UE has started the adjustments for beam switching to the second beam.

Since UE and scheduling node are interrelated apparatuses, any details, examples or embodiments disclosed for the UE shall be understood to have a counterpart for the scheduling node, even if not explicitly disclosed. Moreover, any details of apparatus operation shall be understood to correspond to method steps, and vice versa. For example, an operation or step of the UE (or UE transceiver) receiving a certain signal or transmission corresponds to a step of the scheduling node (or SN transceiver) transmitting the same signal.

The time or frequency resource is a time resource or frequency resource for monitoring a PDCCH. For instance, in a case of TDM, a time resource is a monitoring occasion in time of a search space or search spaces. In a case of FDM, frequency resources may comprise a resource block or a set of resource blocks of a CORESET.

For instance, each beam may be indicated by a corresponding TCI (Transmission Configuration Indicator) state, e.g., the TCI state may be a TCI state specifying an SSB or a reference signal (e.g., CSI-RS, Channel State Information Reference Signal) transmitted on the beam.

Beam switching of a UE from a first beam to a second beam may be performed due to a change in location of a UE from a direction of the first beam towards the direction of the second beam. For instance, the base station decides to switch the UE's serving beam based on results of channel measurements or power measurements (e.g., reference signal received power) for the different beams performed by the UE, which transmits the results of the measurements to the scheduling node.

As mentioned, switching from the first time or frequency resource to the second time or frequency resource is performed based on the signal initiating the switching to the second beam. Such signal could be a MAC CE, or DCI. Further, one DCI may contain beam switching indication for one UE or a group of UEs. Accordingly, beam switching triggers the adaptation of PDCCH monitoring occasions.

Moreover, switching to the second time or frequency resource is also performed based on an indication of the second time or frequency resource. In accordance with exemplary embodiments to be described further, the UE may receive the indication from the base station and/or store the indication in a memory, such as a memory comprised by the UE or a memory device such as a SIM (subscriber identity module) for which the UE comprises a memory interface.

When the indication is transmitted to the UE, the indication of the time or frequency resource may be included in the signal initiating the beam switching, or in a separate signal. Examples for the signal for initiating the beam switching include a MAC CE or a DCI, and examples for separate signaling include MAC CE, DCI, or RRC signaling.

The UE performs the switching at the action timing of switching beams. Correspondingly, the scheduling node starts allocating the second PDCCH to the second resources starting from a timing of the UE switching from the first beam to the second beam, e.g., since the scheduling node is aware of the UE's action timing for switching to the second beam, the scheduling node allocates the second PDCCH to the second time or frequency resource starting from a time when the scheduling node knows that the UE has accomplished the switching even in view of possible propagation delays. From this timing, the scheduling node no longer allocates the first PDCCH for the UE to the first resources.

Each of a plurality of beams is associated with an associated time or frequency resource out of a plurality of time or frequency resources. This association implies that transmissions and/or receptions on the beam are performed on the time and/or frequency resource allocated with the beam.

The association between beams and time or frequency resources is stored in the scheduling node, and may also be known to the UE, e.g., in a configuration, which may be stored (e.g., a hard coded or static configuration) or signaled semi-statically via higher-layer signaling such as RRC signaling.

In some embodiments, which will be described in more detail, the indication of the second time or frequency resource indicates the association between the plurality of beams including the first beam and the second beam and the plurality of corresponding time or frequency resources including the first time or frequency resource associated with the first beam and second time or frequency resource associated with the second beam. For instance, the UE (or more specifically, UE transceiver, 870) receives an indication, which is transmitted from the scheduling node, of the beam for switching to (the second beam) by the signal initiating the beam switching, and knows the time or frequency resource to be switched to (the second resource) from the association between beams and time or frequency resources. In another example, the SN transceiver 820, in operation, transmits RRC signaling indicating the association between the plurality of beams and the corresponding time or frequency resources.

Figure 11:
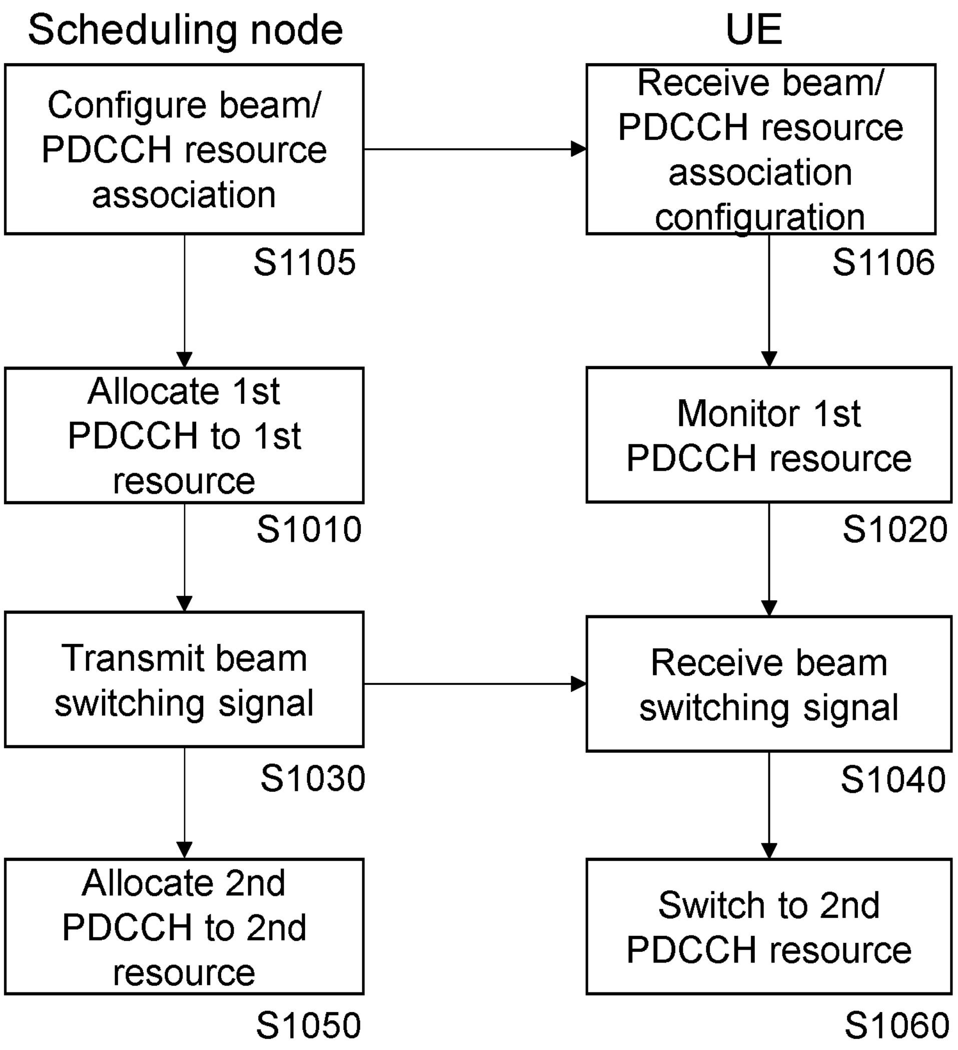

Exemplary embodiments of methods for the UE and the scheduling node are shown in FIG. 11. In addition to the method steps shown in FIG. 10, the scheduling node method includes step S1105 of configuring the association between the plurality of beams and the corresponding time or frequency resources. The SN circuitry 830 may generate this configuration, and the SN transceiver 820 may transmit the configuration to the UE to be received, using the UE transceiver 870, in step S1106.

As mentioned, the first PDCCH and the second PDCCH may be specific to groups of UEs comprising the UE. For instance the first PDCCH and the second PDCCH may be group-common PDCCHs, as shown in FIG. 7, wherein the first PDCCH is used for control information (e.g., scheduling information) for the UEs served by the first beam, and the second PDCCH carries control information for the UEs served by the second beam. Accordingly, when the UE switches from the first beam to the second beam, the scheduling node stops signaling control information for scheduling the switched UE via the first PDCCH, and starts signaling the control information for the UE on the second beam.

However, the present disclosure is not limited to group-common PDCCHs as it may also be applied to UE-specific PDCCHs.

Time or Frequency Offsets

In some embodiments, as an association between the beams and the time or frequency resources, the plurality of beams are associated with corresponding offsets in time or frequency.

For instance, each beam (or beam usage state, e.g., each TCI state) out of the plurality of beams is associated with an offset, e.g., an offset with respect to the time or frequency resources of a reference beam for UE to monitor PDCCH. An example of the reference beam could be the beam for transmitting a given SSB or CSI-RS. As a result, once the time or frequency resource of the reference beam is known to the UE, by applying the offset associated with the beam indicated by the beam switching signal, UE can determine the corresponding time or frequency resources to monitor PDCCH over the indicated new beam. Note that the reference beam can be defined as the beam with offset=0, whose corresponding time or frequency resources can be flexibly configured to the UE as well, e.g., via the Search Space and/or Control Resource Set configurations.

The offset can be configured in terms of different granularities, such as number of symbols (symbol granularity), number of slots, number of multi-slots (e.g., units of multiple slots), number of CORESET durations (e.g., the time duration of PDCCH candidates or monitoring occasion candidates, as configured in the CORESET), or combinations of one or more of the aforementioned. To enable TDM of the CORESET with different beams, the scheduling node, such as gNB, may ensure that the granularity of the offset is equal to or larger than the CORESET duration, in order to avoid overlapping in time between monitoring occasions for different beams.

Exemplary options for indicating the association between beams and offsets are as follows.

Option 1: The association between the plurality of beams and the corresponding offsets is defined by a configuration of beam usage via radio resource control, RRC, signaling. The configuration of beam usage may be an information element in RRC signaling which configures parameters related to the transmission on a certain beam, such as a TCI-State information element (IE) signaled by RRC signaling.

Option 2: The association between the plurality of beams and the corresponding offsets is defined by a configuration of frequency resources via radio resource control, RRC, signaling. For instance, the definition is signaled in a ControlResourceSet IE by RRC signalling.

Option 3: The offset is defined in standard specification(s). For instance the UE comprises a memory or an interface for a memory, where the memory stores the association between the plurality of beams and the corresponding offsets in accordance with the standard specification(s).

When a CORESET is configured for the UE, multiple TCI states (or, more generally, indications of multiple beams or beam usage states) can be included in the CORESET configuration. The UE can obtain the multiple associated offsets accordingly, e.g., as an association between the offsets and the beam usage or TCI states is already configured in the TCI-State IE (see the above Option 1), or configured directly in the ControlResourceSet IE (see the above Option 2), or defined in the standard specifications and stored in UE's memory (see Option 3).

When the UE receives the signal for switching to the second beam (e.g., a MAC CE or a DCI) including a beam switching command, to activate usage of the second beam as one of the configured beam usage states, such as TCI states for PDCCH monitoring, the UE starts applying the associated offset to the PDCCH monitoring occasions at the same time when it switches to the new beam (the second beam).

Figure 12:
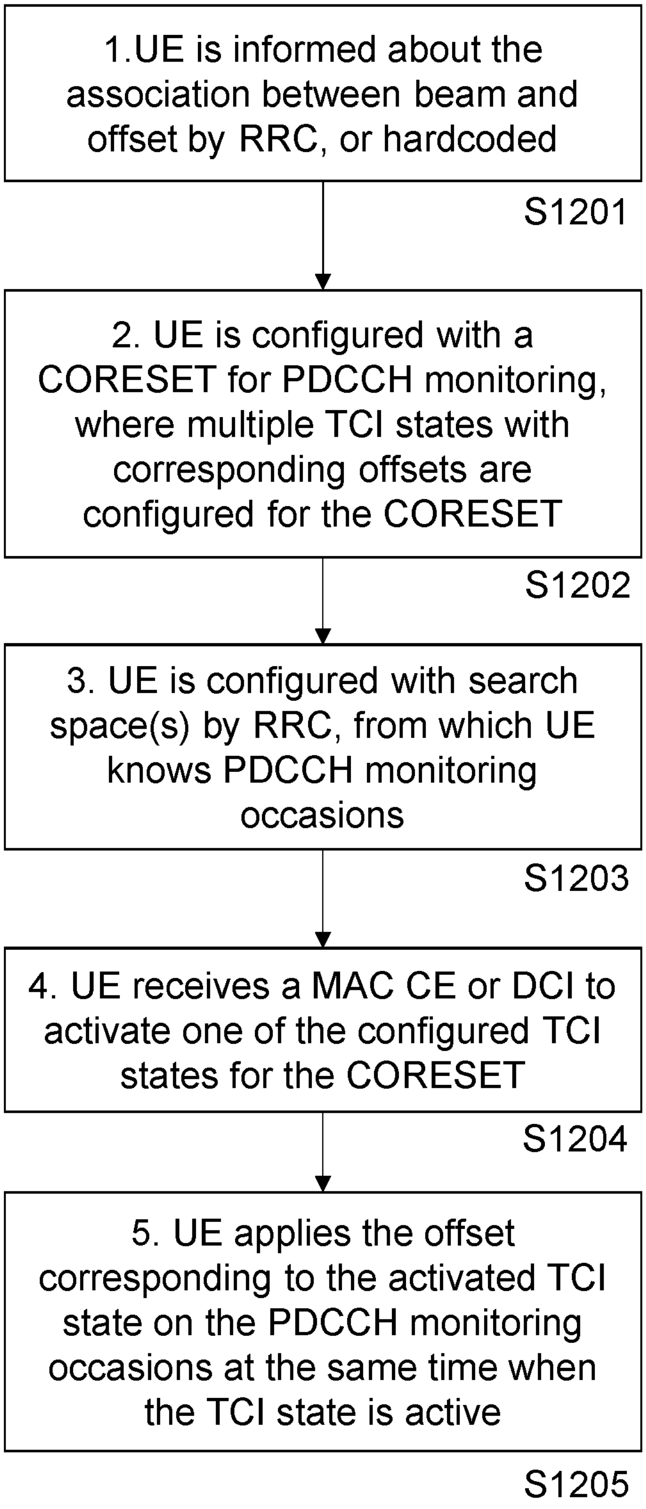
FIGS. 12 to 15 are flow charts illustrating method steps of a communication method for a user equipment.

Exemplary method steps for the UE are shown in FIG. 12 for the embodiments where the time or frequency resources associated with each of the plurality of beams correspond to offsets.

In step S1201, the UE is informed about the association between beams and offsets, e.g., by RRC or hardcoded in accordance with standard specifications. In step S1202 (corresponding to step S1106 from FIG. 11), the UE is configured with a CORESET for PDCCH monitoring, where multiple beam usage states (e.g., TCI states) with corresponding offsets are configured for the CORESET (e.g., in accordance with above-mentioned Options 1, 2 or 3).

For Option 1, the offsets may be obtained via ControlResourceSet→TCI State→offset parameter; for Option 2, the offsets may be obtained via ControlResourceSet itself; for Option 3, the offsets may be obtained from ControlResourceSet→TCI State→offset. The difference from Option 1 is that here in Option 3 offset value for each TCI state is already pre-stored in UE memory, therefore, no offset parameter is provided inside TCI State IE.

Further, in step S1203, the UE is configured with search space(s) by RRC, from which UE knows PDCCH monitoring occasions. These monitoring occasions can be regarded as occasions for the reference beam (e.g., with zero offset). In step S1204 (corresponding to step S1040 from FIGS. 10 and 11), the UE receives, as a signal initiating switching to the new beam (the second beam), a MAC CE or DCI to activate one of the configured TCI states for the CORESET. Then, in step S1205, the UE applies the offset corresponding to the activated TCI state on the PDCCH monitoring occasions at the same time when the TCI state is active (e.g., starting from the switching timing of switching to the new beam or TCI state in accordance with step S1060).

In accordance with the above-listed Option 1, an association between TCI states and time offsets is indicated to the UE via TCI-State information element by RRC signaling, as shown by the highlighting in the following code example.

TCI-State Information Element

```
-- ASN1START
-- TAG-TCI-STATE-START
TCI-State ::=          SEQUENCE {
  tci-StateId            TCI-StateId,
  qcl-Type1              QCL-Info,
  qcl-Type2              QCL-Info
OPTIONAL,   -- Need R
  offset             ENUMERATED {n0, n1, n2, n3, n4, ...},
  ...
}
QCL-Info ::=           SEQUENCE {
  cell                   ServCellIndex
OPTIONAL,   -- Need R
  bwp-Id                 BWP-Id
OPTIONAL,   -- Cond CSI-RS-Indicated
  referenceSignal        CHOICE {
    csi-rs                 NZP-CSI-RS-ResourceId,
    ssb                    SSB-Index
  },
  qcl-Type               ENUMERATED {typeA, typeB, typeC, typeD},
  ...
}
-- TAG-TCI-STATE-STOP
-- ASN1STOP
```

In the above example, the offset is configured by the number of symbols. However, it may also be configured in number of slots, or number of multi-slots. A further example is shown below, where the offset is configured by the granularity of CORESET duration.

TCI-State Information Element

```
...
TCI-State ::=                    SEQUENCE {
  tci-StateId                      TCI-StateId,
  qcl-Type1                        QCL-Info,
  qcl-Type2                        QCL-Info
OPTIONAL,   -- Need R
  offset                       ENUMERATED
{0, 1xCoReSetDuration, 2xCoReSetDuration, 3xCoReSetDuration, ...},
  ...
}
...
```

As an example of Option 2 shown by the following code, the association between TCI states and time offsets is indicated to UE via ControlResourceSet IE, the information element configuring the CORESET, where multiple TCI states together with the associated time offsets are configured for the CORESET.

ControlResourceSet Information Element

```
-- ASN1START
-- TAG-CONTROLRESOURCESET-START
ControlResourceSet ::=                      SEQUENCE {
  controlResourceSetId                        ControlResourceSetId,
  frequencyDomainResources                    BIT STRING (SIZE (45)),
  duration                                    INTEGER (1..maxCoReSetDuration),
  cce-REG-MappingType                         CHOICE {
      interleaved                               SEQUENCE {
        reg-BundleSize                            ENUMERATED {n2, n3, n6},
        interleaverSize                           ENUMERATED {n2, n3, n6},
        shiftIndex
INTEGER (0..maxNrofPhysicalResourceBlocks-1)      OPTIONAL,   -- Need S
      },
      nonInterleaved                            NULL
  },
```

-continued

ControlResourceSet Information Element

```
  precoderGranularity                        ENUMERATED {sameAsREG-bundle,
allContiguousRBs},
  tci-StatesPDCCH-ToAddList                  SEQUENCE (SIZE (1..maxNrofTCI-
StatesPDCCH)) OF TCI-StateId OPTIONAL,   -- Cond NotSIB1-initialBWP
  tci-StatesPDCCH-ToReleaseList              SEQUENCE (SIZE (1..maxNrofTCI-
StatesPDCCH)) OF TCI-StateId OPTIONAL,   -- Cond NotSIB1-initialBWP
  tci-Offset-ToAddList                        SEQUENCE (SIZE (1..maxNrofTCI
-
StatesPDCCH)) OF tci-offset
  tci-offset ::=                              SEQUENCE {
    tci-StatesPDCCH                             TCI-StateId
    offsetValue                                 ENUMERATED {0, 1xduration,
2xduration, ...},
  }
  tci-Offset-ToReleaseList                      SEQUENCE (SIZE
(1..maxNrofTCI-StatesPDCCH)) OF TCI-StateId
  tci-PresentInDCI                            ENUMERATED {enabled}
OPTIONAL,   -- Need S
  pdcch-DMRS-ScramblingID                     INTEGER (0..65535)
OPTIONAL,   -- Need S
  ...,
  [[
  rb-Offset-r16                               INTEGER (0..5)
OPTIONAL,   -- Need N
  tci-Present InDCI-ForDCI-Format1-2-r16      INTEGER (1..3)
OPTIONAL,   -- Need S
  coresetPoolIndex-r16                        INTEGER (0..1)
OPTIONAL,   -- Need R
  controlResourceSetId-r16                    ControlResourceSetId-r16
OPTIONAL   -- Need S
  ]]
}
-- TAG-CONTROLRESOURCESET-STOP
-- ASN1STOP
```

In accordance with above Option 3, the offset is defined in standard specifications. An example is shown below in Table 1, where the offset is defined with reference to the SSBs for the plurality of beams.

TABLE 1

Offset definition

| Beam Reference | Offset |
|---|---|
| SSB#0 | 0 |
| SSB#1 | 1 × StepSize |
| SSB#2 | 2 × StepSize |
| SSB#3 | 3 × StepSize |
| . . . | |

For the above definition in Table 1, possible examples of how the step size (parameter "StepSize") can be defined are CORESET duration or number of symbols and/or slots. As a further example, the step size may be defined, e.g., as CORESET duration+x symbol(s), where "x symbol(s)" is provided as an additional one or more symbol gap to allow gNB beam switching time. The definition of the step size can be provided, e.g., in the standard or, alternatively, broadcast via system information.

Groups of Search Spaces

In some embodiments, the plurality of beams are associated with corresponding groups of search spaces defining monitoring occasions in time. Accordingly, the association between the plurality of beams and time resources consists in an association between beams and search space groups.

Therein, different groups of search spaces (or "search space sets") with different MOs are configured to UE, where each group is associated with a beam usage. For instance, in the configuration of the search space (e.g., the SearchSpace IE in RRC), a plurality of search space groups are defined having the same number as the plurality of beams and differing from each other by different non-overlapping monitoring occasions in time. Each group is linked to a TCI state. The different groups are identified by group IDs having a number of bits sufficiently large for accommodating (or indicating) a number of beams (e.g., TCI states corresponding to the beams) of the plurality of configured beams which may serve the UE and to which the UE may be switched. For instance, if the number of beams (or configured TCI states) is greater than 2, the number of bits of the group indication or group ID is greater than one. Once a new beam usage is indicated to UE via the signal initiating the beam switching, the UE switches to the corresponding group.

The UE is configured with a plurality of groups of search spaces, where the groups differ at least by the monitoring occasions. As mentioned, different MOs in the different groups are non-overlapping in time to allow for TDM beamforming operation. For instance, the scheduling node ensures that monitoring occasions of groups linked to or associated with different beams are non-overlapping in time.

Each group is linked to one beam (e.g., TCI state). Such linkage or association can be maintained by the scheduling node without awareness of the UE.

Alternatively, the association between the plurality of beams and the corresponding groups of search spaces is defined by a configuration of the search spaces via RRC signaling. For instance, the linkage may be signaled to the UE when configuring the group by RRC (e.g., the associated TCI state ID can be maintained in the search space configuration such as SearchSpace IE, or alternatively, the associated group ID can be maintained in the TCI state configuration such as TCI-State IE in the following highlighted code example).

TCI-State Information Element

```
-- ASN1START
-- TAG-TCI-STATE-START
...
QCL-Info ::=          SEQUENCE {
  cell                  ServCellIndex
OPTIONAL,    -- Need R
  bwp-Id                BWP-Id
OPTIONAL,    -- Cond CSI-RS-Indicated
  group-Id                              Group-Id
OPTIONAL,
  referenceSignal       CHOICE {
    csi-rs                NZP-CSI-RS-ResourceId,
    ssb                   SSB-Index
  },
  qcl-Type              ENUMERATED {typeA, typeB, typeC, typeD},
  ...
}
-- TAG-TCI-STATE-STOP
-- ASN1STOP
```

After the UE receives the beam switching command included in the signal initiating the beam switching (e.g., via MAC CE or DCI), the UE also switches to the corresponding search space group for PDCCH monitoring in addition to switching to the new beam.

If the UE is not aware of the linkage between beams and associated search space groups, an explicit group switching indication needs to be received by the UE (e.g., via DCI). Such explicit group-switching indication need not be signaled if the UE has been informed of the linkage before.

Figure 13:
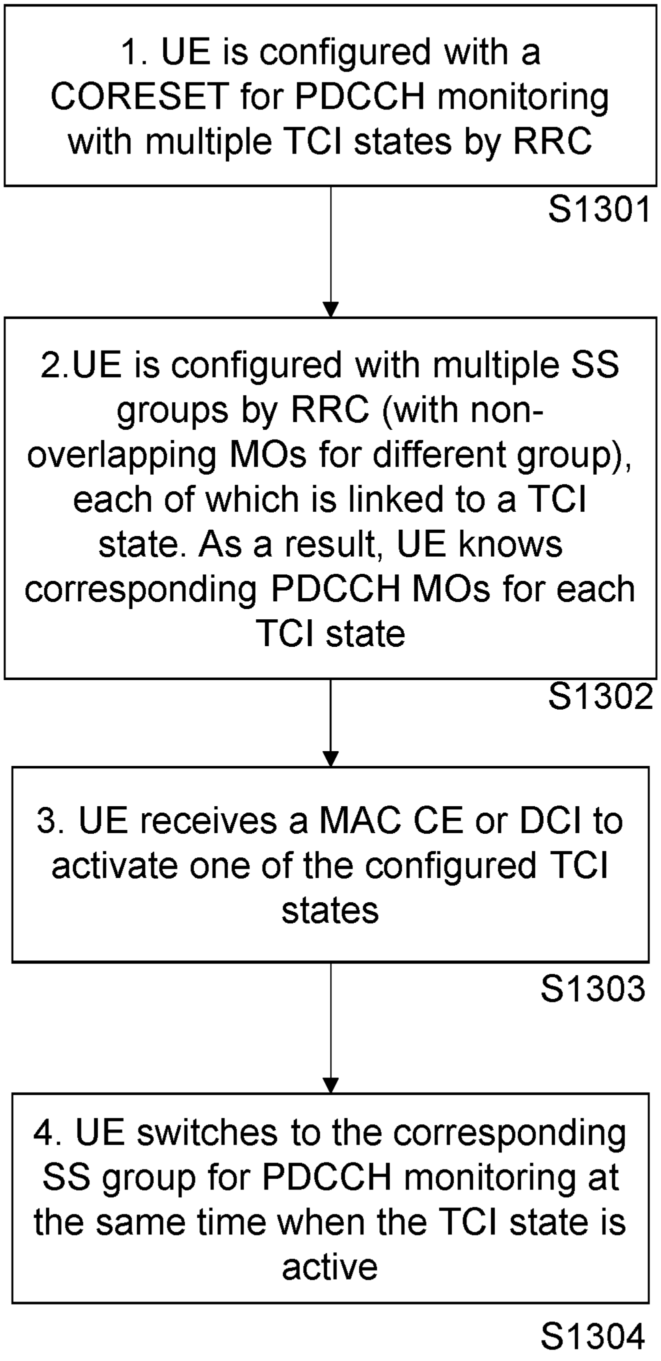

Method steps for a UE method for switching the search space group are shown in FIG. 13 for the case that the case that the linkage or association between groups of search spaces and TCI states corresponding to the beams is known to the UE from a configuration received with RRC signaling.

In step S1301, the UE is configured, by RRC, with a CORESET for PDCCH monitoring, wherein the CORESET includes a plurality of beam usage states, such as TCI states. The UE is further configured by RRC with multiple groups of search spaces, where monitoring occasions of different groups are non-overlapping in time and where each group is linked to a beam usage state (S1302 corresponding to step S1106). As a result of step S1302, the UE knows corresponding PDCCH monitoring occasions for each beam. In step S1303 embodying step S1040, the UE receives a signal initiating switching from one beam to another beam, e.g., a MAC CE or DCI to activate one of the configured TCI states associated with the new beam. Finally, in step S1304 embodying step S1060, the UE switches to search space group corresponding to the new beam at the time of switching to the new beam, e.g., at the time when the new TCI state is activated.

Figure 14:
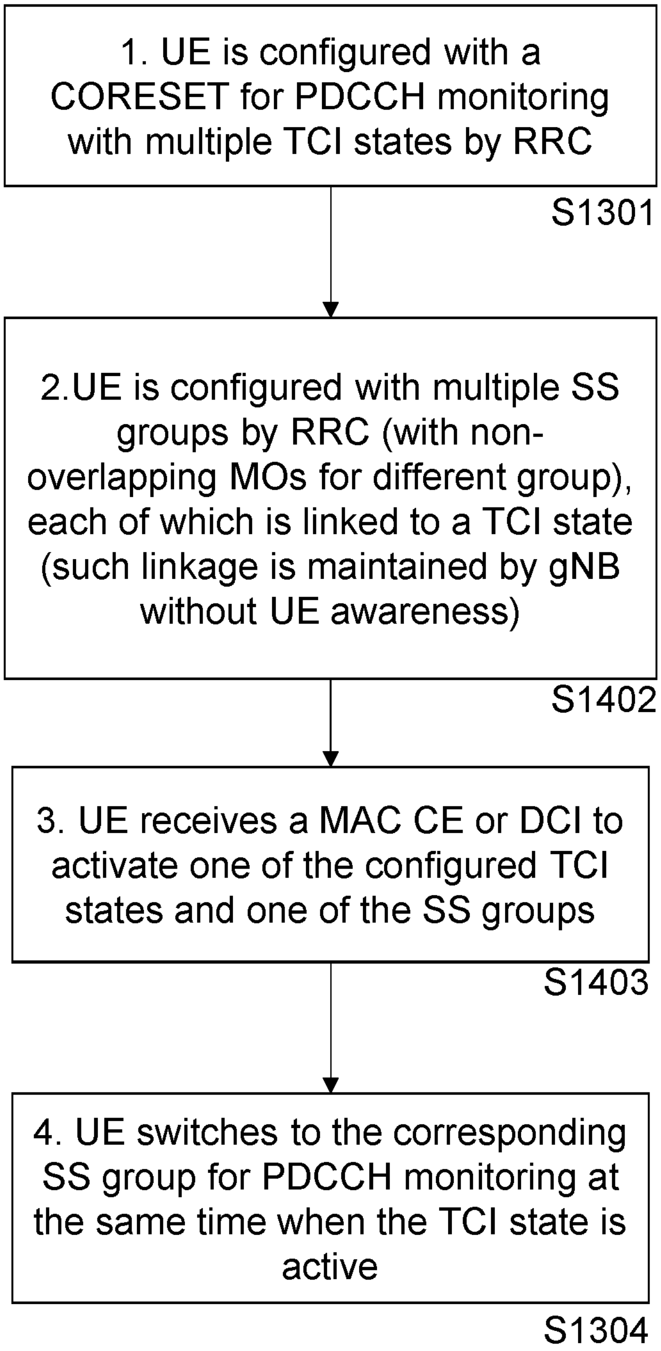

However, as mentioned, the association or linkage between beams and search space groups can also be maintained by the scheduling node without the UE being aware of the linkage. Exemplary steps for a UE method corresponding to the case that the linkage between search space group and beam usage/TCI state is not known to the UE are shown in FIG. 14. The example from FIG. 14 differs from FIG. 13 by steps 1402 and S1403. In particular, in step S1402, the UE is RRC-configured with a plurality of search space groups, with non-overlapping MOs for different groups. Although each of the configured search space group is linked to a beam usage state, such linkage is maintained by the scheduling node without the UE being aware of it. In step S1403, the UE receives a signal such as a MAC CE or DCI to activate one of the configured TCI states and one of the SS groups. Both switching commands of switching the search space group and the beam may be provided in the same signal or in separate signals.

For example, the UE is configured with a plurality of groups of search spaces defining monitoring occasions in time, and the signal initiating switching the beam (e.g., MAC CE or DCI) indicates a group of search spaces associated with the second beam, out of the plurality of groups of search spaces as the second time resource.

As another example, the UE is configured with a plurality of groups of search spaces defining monitoring occasions in time, and the UE receives a first signal initiating switching from the first beam to the second beam, and a second signal including an indication of a group of search spaces associated with the second beam, out of the plurality of groups of search spaces as the second time resource. For instance, a MAC CE as the first signal initiates beam switching, and a DCI as the second signal initiates switching of the search space group, or both signals are transmitted by DCI with different bit-fields.

Activation Condition

In some embodiments, the indication of the second time or frequency resource as well as an indication to switch to the second time or frequency resource are received by the UE in RRC signaling.

For example, before the UE switches beams in accordance with the (DCI or MAC CE) signal initiating the switching, the scheduling node changes the configuration of PDCCH monitoring occasions with a condition that the changed configuration will be activated by the UE at the same time when the UE activates the new beam. Before indicating UE to switch beams (or TCI states), the scheduling node first reconfigures the monitoring occasions of the search space by RRC, with a condition that the new PDCCH monitoring occasions start being activated at the time UE switches to the new beam (TCI state). Such reconfiguration may be made using a SearchSpace IE, examples of which are presented below.

SearchSpace Information Element

```
-- ASN1START
-- TAG-TCI-STATE-START
SearchSpace ::=                           SEQUENCE {
  searchSpaceId                             SearchSpaceId,
  controlResourceSetId                      ControlResourceSetId,
OPTIONAL,    -- Cond SetupOnly
  monitoringSlotPeriodicityAndOffset        CHOICE {
    ...
  }
OPTIONAL,    -- Cond Setup
  duration                                  INTEGER (2..2559)
OPTIONAL,    -- Need R
  monitoringSymbolsWithinSlot               BIT STRING (SIZE (14))
OPTIONAL,    -- Cond Setup
  activatedByTCI                ENUMERATED {enabled, disabled},
  ...
}
...
-- TAG-TCI-STATE-STOP
-- ASN1STOP
```

As can be seen in the above IE for the search space, in addition to the position of the monitoring occasions, which is configured by the parameters monitoringSlotPeriodicityAndOffset (slot position/periodicity) and monitoringSymbolsWithinSlot (symbol position within slot(s)), the condition, which may for instance be called activatedByTCI, is included as an indication for switching to the new monitoring occasions at the time as switching to the new beam. When the condition is configured to be enabled, the UE switches the monitoring occasions (or other time or frequency resource) at the time instance of beam switching.

In another example shown below, the condition is indicated with reference to a system frame number (SFN). In accordance with this configuration, the UE activates the new search space to be switched to simultaneously with beam switching in the indicated frame (indicated by the parameter activationReference).

SearchSpace information element

```
-- ASN1START
-- TAG-TCI-STATE-START
SearchSpace ::=                        SEQUENCE {
searchSpaceId                            SearchSpaceId,
controlResourceSetId                     ControlResourceSetId,
OPTIONAL,   -- Cond SetupOnly
monitoringSlotPeriodicityAndOffset       CHOICE {
...
}
OPTIONAL,   -- Cond Setup
duration                                 INTEGER (2..2559)
OPTIONAL,   -- Need R
monitoringSymbolsWithinSlot              BIT STRING (SIZE (14))
OPTIONAL,   -- Cond Setup
activationReference                    INTEGER (0..5119) ,
...
}
...
-- TAG-TCI-STATE-STOP
-- ASN1STOP
```

Figure 15:
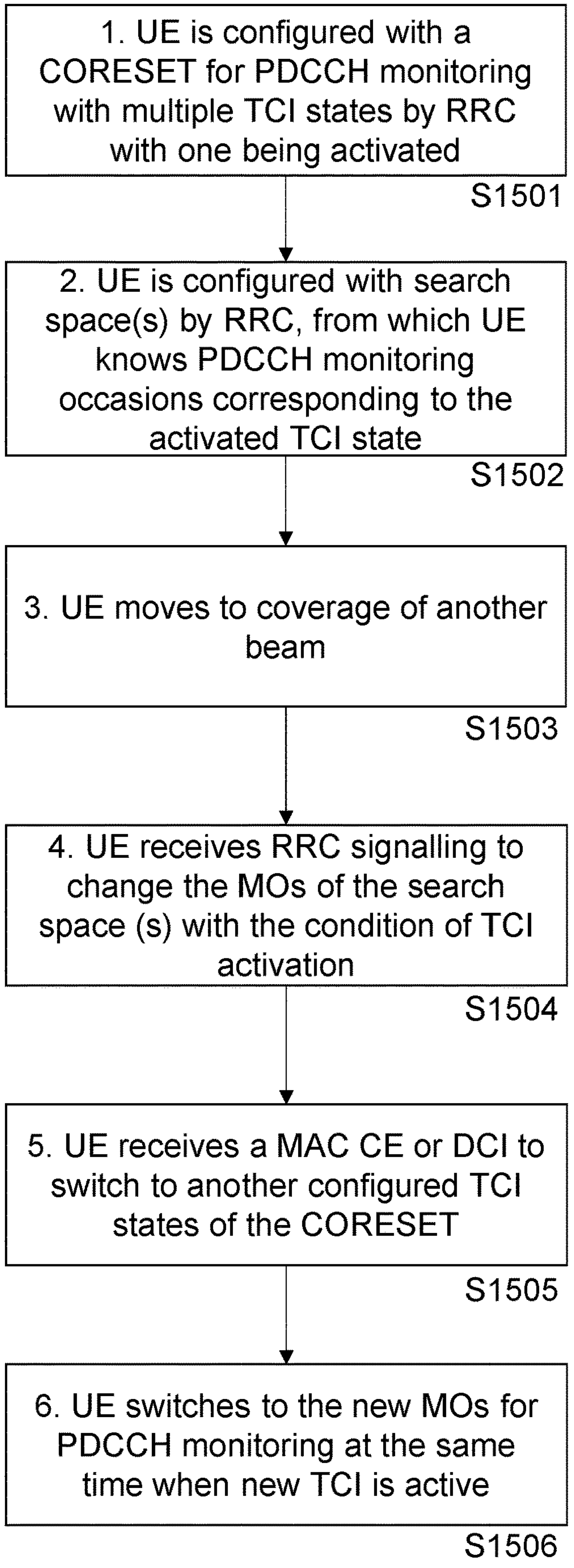

Method steps to be performed by the UE in an embodiment where the switching of the MOs is activated by a condition in RRC signalling are shown in FIG. 15. In step S1501, the UE is configured with a CORESET for PDCCH monitoring with multiple beam usage states by RRC signalling (step S1501). One of these beam usage states is activated, e.g., a TCI state with lowest ID is activated by default before the UE receives any MAC CE or DCI for activation; or another possibility is that the SSB beam or the CSI-RS beam that the UE identified during the random access procedure is activated without receiving any MAC CE or DCI activation command. The activated beam usage state corresponds to the beam currently serving the UE. Further, in step S1502, the UE is configured with search space(s) by RRC, from which UE knows PDCCH monitoring occasions corresponding to the activated beam usage state. In step S1503, the UE moves to the coverage area of another beam. It should be noted that such motion to another coverage area may be present in each of the embodiments disclosed, although not explicitly shown in the remaining flow charts. After having moved to the new coverage area, in step S1504, the UE receives RRC signalling to change the MOs of the search space (s) with the condition of TCI activation, e.g., receives a new search space information element including the indication (e.g., condition or timing in terms of a frame number) to switch to the second time or frequency resource at the timing of switching to the second beam. Then, after receiving, in step S1505, a signal such as a MAC CE or DCI initiating switching to another TCI state configured in step S1501 by the CORESET, the UE switches the new MO(s) for monitoring the PDCCH at the time of switching to the new beam, e.g., by activating the new TCI state (step S1506).

The techniques provided in the present disclosure allow for coordinating beam switching and switching of time or frequency resource such as MOs for a group-common or a UE-specific PDCCH. In particular, the embodiments entitled "Activation condition" facilitates aligning the action timing between beam switching (e.g., via MAC CE or DCI) and MO reconfiguration (via RRC). Alignment of the action timing of beam and MO switching is also facilitated by the embodiments described under "Time or frequency offsets" and "Groups of search spaces." In addition, fast joint beam and MO switching is facilitated in a resource efficient manner where time as well as signalling overhead are saved by avoiding the need for an additional RRC configuration for a new time or frequency resource to be switched to.

As mentioned, the present disclosure is applicable to (group-)common PDCCHs, and can also be applied to UE specific PDCCHs. As mentioned, a possible use case of applying the disclosed beam switching techniques to group-common PDCCHs is a multi-beam scenario where different groups of UEs are served by different beams.

A possible use case for applying the disclosed techniques to a UE-specific PDCCH may be envisaged for unlicensed operation. For instance, a scheduling node (e.g., gNB) first acquires the channel and transmits a common (e.g., group-common) PDCCH with a wide beam to initiate the channel occupancy. Then a plurality of narrower beams are TDMed for transmitting UE-specific PDCCHs to different UEs inside the coverage of the channel occupancy declared by wide beam. In such case, the beam usage indication may be indicated to the group of UEs at the beginning of the channel occupancy using group-common PDCCH via wide beam.

On the other hand, in some use cases, the disclosed techniques may only be applicable to group-common PDCCH, but not UE-specific PDCCH. In more details, different time or frequency resources for group-common PDCCH are associated with different beams as one example shown in FIG. 7. However, UE-specific PDCCHs for different UEs are transmitted over the same time and frequency resources (e.g., SDM, spatial-division multiplexing). The advantage of such operation is to improve the efficiency for resource utilization. For example, the scheduling node can configure UE-specific MOs for a group of UEs to be concentrated at the beginning of the slot such as first two symbols (regardless of serving beams), and then fills in the rest of symbols within a slot by PDSCHs, since other symbols do not need to be reserved for PDCCH over other beams.

Moreover, some examples and embodiments have been provided where MO adaptation in time domain is considered to be performed together and simultaneously with beam switching. However, the present disclosure is generally applicable to time or frequency resources as MOs. Thus, similarly, the present disclosure is applicable to the frequency domain as well if different beams are frequency division multiplexed (FDM), e.g., over different BWPs or component carriers. In such a case, beam switching triggers MO adaptation in frequency domain. For instance, the association between beams and corresponding frequency resources consists in an association between beams (or TCI states) and frequency offsets (e.g., indicated via TCI state IE or search space IE), CORESETs, groups of CORESETs, or BWP configurations.

Moreover, the plurality of beams mentioned in the present disclosure may be sent from or generated by a single cell or TRP (transmission and reception point) or by different TRPs/cells.

Further, the disclosure is applicable both to licensed as well as unlicensed band operation (e.g., see the above-mentioned scenario for UE-specific PDCCH).

When applied to high frequency operation such as millimetre wave operation, the present disclosure facilitates meeting low latency requirements of fast and frequent beam switching. However, the present disclosure is not restricted to any operating frequency band.

In some embodiments, the signal initiating beam switching or a separate signal such as a MAC CE or a DCI includes the indication of the second time or frequency resource. An example has been provided above where the search space group to be switched to is indicated via MAC CE or DCI without the UE being aware of the association between search space groups and beams or beam usage states. Similarly, an offset value (e.g., an offset with respect to a reference beam) may be directly indicated when the beam usage is indicated to the UE via the first signal or a second signal such as MAC CE or DCI.

As described, the offset mentioned in some embodiments is an offset with respect to a time or frequency resource of a reference beam. The concept of offset allows for flexible positions of each beam. However, instead of using an offset, different MOs corresponding to different beams may be directly configured in the configuration of the search space, e.g., via RRC. Such configuration may facilitate defining different MOs for different beams in a more flexible manner, e.g., with respect to the positions and sizes/durations of the MOs in time and/or frequency.

In summary, a user equipment, UE, is provided in a first embodiment, comprising circuitry which, in operation, monitors a first time or frequency resource for a first physical downlink control channel, PDCCH, on a first beam, and a transceiver which, in operation, receives a signal initiating switching from the first beam to a second beam, wherein the circuitry, in operation, at a timing of switching to the second beam, switches to a second time or frequency resource to be monitored for a second PDCCH on the second beam based on the signal and an indication of the second time or frequency resource, and wherein the first and the second PDCCHs are specific to the UE or to respective groups of UEs comprising the UE.

In a second embodiment, in addition to the first embodiment, the indication of the second time or frequency resource indicates an association between a plurality of beams and corresponding time or frequency resources, the plurality of beams including the first beam associated with the first time or frequency resource and the second beam associated with the second time or frequency resource.

In a third embodiment, provided in addition to the second embodiment, the plurality of beams are associated with corresponding offsets in time or frequency.

In a fourth embodiment, provided in addition to the third embodiment, an association between the plurality of beams and the corresponding offsets is defined by a configuration of beam usage via radio resource control, RRC, signaling.

In a fifth embodiment, provided in addition to the third embodiment, an association between the plurality of beams and the corresponding offsets is defined by a configuration of frequency resources via radio resource control, RRC, signaling.

In a sixth embodiment, provided in addition to the third embodiment, the UE comprises a memory which, in operation, stores an association between the plurality of beams and the corresponding offsets in accordance with a standard specification.

In a seventh embodiment, provided in addition to the second embodiment, the plurality of beams are associated with corresponding groups of search spaces defining monitoring occasions in time.

In an eighth embodiment, provided in addition to the seventh embodiment, the UE is configured with the seventh embodiment, an association between the plurality of beams and the corresponding groups of search spaces is defined by a configuration of the search spaces via RRC signaling.

In a ninth embodiment, in addition to the first or second embodiments, the UE is configured with a plurality of groups of search spaces defining monitoring occasions in time, and the UE receives

- a first signal initiating switching from the first beam to the second beam, and
- a second signal including an indication of a group of search spaces associated with the second beam, out of the plurality of groups of search spaces as the second time resource.

In a tenth embodiment, in addition to the first and second embodiments, the UE is configured with a plurality of groups of search spaces defining monitoring occasions in time, and the signal indicates a group of search spaces associated with the second beam, out of the plurality of groups of search spaces as the second time resource.

In an eleventh embodiment, in addition to the first and second embodiments, the transceiver, in operation, receives radio resource control, RRC, signaling including an indication of the second time or frequency resource and including an indication to switch to the second time or frequency resource at the timing of switching to the second beam.

Further, a scheduling node is provided in a twelfth embodiment, comprising circuitry, which, in operation, allocates a first physical downlink channel, PDCCH, to a first time or frequency resource when serving a user equipment, UE, on a first beam, in accordance with an association between a plurality of beams and corresponding time or frequency resources, the plurality of beams including the first beam and a second beam, and transceiver, which, in operation, transmits a signal initiating switching of the user equipment, UE, from the first beam to the second beam, wherein the circuitry, in operation, allocates a second PDCCH to a second time or frequency resource in accordance with the association between the plurality of beams and the corresponding time or frequency resources, when serving the UE on the second beam, and wherein the first and the second PDCCHs are specific to the UE or to respective groups of UEs comprising the UE.

In a thirteenth embodiment, in addition to the twelfth embodiment, the transceiver, in operation, transmits radio resource control, RRC, signaling indicating the association between the plurality of beams and the corresponding time or frequency resources.

A communication method for a user equipment, UE, is provided in a fourteenth embodiment, comprising the steps of monitoring a first time or frequency resource for a first physical downlink control channel, PDCCH, on a first beam, receiving a signal initiating switching from the first beam to a second beam, and at a timing of switching to the second beam, switching to a second time or frequency resource to be monitored for a second PDCCH on the second beam based on the signal and an indication of the second time or frequency resource, wherein the first and the second PDCCHs are specific to the UE or to respective groups of UEs comprising the UE.

A communication method for a scheduling node is provided in a fifteenth embodiment, comprising the steps of allocating a first physical downlink channel, PDCCH, to a first time or frequency resource when serving a user equipment, UE, on a first beam, in accordance with an association between a plurality of beams and corresponding time or frequency resources, the plurality of beams including a first beam and a second beam, transmitting a signal initiating switching of a user equipment, UE, from the first beam to the second beam, and allocating a second PDCCH to a second time or frequency resource in accordance with the association between the plurality of beams and the corresponding time or frequency resources, when serving the UE on the second beam, wherein the first and the second PDCCHs are specific to the UE or to respective groups of UEs comprising the UE.

It is noted that the second to eleventh embodiment are correspondingly applicable to the scheduling node of the twelfth embodiment and that the thirteenth embodiment is correspondingly applicable to the user equipment of the first embodiment.

Moreover, the steps performed by the circuitry in operation, the steps performed by the transceiver in operation, and the steps performed by the memory, in operation, referred to in the above first to thirteenth UE and scheduling node embodiments correspond to respective method steps.

In addition, a non-transitory medium is provided storing program instructions which, when executed on a processing circuitry such as a general purpose processor, cause the processing circuitry to perform all steps of the above mentioned method embodiments.

Further provided is an integrated circuit for a communication apparatus such as a UE or scheduling node, which controls the communication apparatus to perform all steps of the above mentioned method embodiments.

The present disclosure can be realized by software, hardware, or software in cooperation with hardware. Each functional block used in the description of each embodiment described above can be partly or entirely realized by an LSI (large scale integration) such as an integrated circuit (IC), and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples. Summarizing, provided are a UE, a scheduling node, and methods for a UE and for a scheduling node. The UE comprises circuitry which, in operation, monitors a first time or frequency resource for a first physical downlink control channel, PDCCH, on a first beam, and a transceiver which, in operation, receives a signal initiating switching from the first beam to a second beam, wherein the circuitry, in operation, at a timing of switching to the second beam, switches to a second time or frequency resource to be monitored for a second PDCCH on the second beam based on the signal and an indication of the second time or frequency resource, and wherein the first and the second PDCCHs are specific to the UE or to respective groups of UEs comprising the UE.

The invention claimed is:

1. A user equipment (UE), comprising:

circuitry which, in operation, monitors a first time or frequency resource for a first physical downlink control channel (PDCCH) on a first beam; and a transceiver which, in operation, receives a signal initiating switching from the first beam to a second beam;

wherein the circuitry, in operation, at a timing of switching to the second beam, switches to a second time or frequency resource to be monitored for a second PDCCH on the second beam based on the signal and an indication of the second time or frequency resource, wherein the indication of the second time or frequency resource is derived from the signal, and wherein the first and the second PDCCHs are specific to the UE or to respective groups of UEs comprising the UE.

2. The UE according to claim 1, wherein the indication of the second time or frequency resource indicates an association between a plurality of beams and corresponding time or frequency resources, the plurality of beams including the first beam associated with the first time or frequency resource and the second beam associated with the second time or frequency resource.

3. The UE according to claim 2, wherein the plurality of beams are associated with corresponding offsets in time or frequency.

4. The UE according to claim 3, wherein an association between the plurality of beams and the corresponding offsets is defined by a configuration of beam usage via radio resource control (RRC) signaling.

5. The UE according to claim 3, wherein an association between the plurality of beams and the corresponding offsets is defined by a configuration of frequency resources via radio resource control (RRC) signaling.

6. The UE according to claim 3, comprising a memory which, in operation, stores an association between the plurality of beams and the corresponding offsets in accordance with a standard specification.

7. The UE according to claim 2, wherein the plurality of beams are associated with corresponding groups of search spaces defining monitoring occasions in time.

8. The UE according to claim 7, wherein an association between the plurality of beams and the corresponding groups of search spaces is defined by a configuration of the search spaces via radio resource control (RRC) signaling.

9. The UE according to claim 1, which is configured with a plurality of groups of search spaces defining monitoring occasions in time, wherein the UE receives a first signal initiating switching from the first beam to the second beam, and a second signal including an indication of a group of search spaces associated with the second beam, out of the plurality of groups of search spaces as the second time resource.

10. The UE according to claim 1, wherein the UE is configured with a plurality of groups of search spaces defining monitoring occasions in time, and the signal indicates a group of search spaces associated with the second beam, out of the plurality of groups of search spaces as the second time resource.

11. The UE according to claim 1, wherein the transceiver, in operation, receives radio resource control (RRC) signaling including an indication of the second time or frequency resource and including an indication to switch to the second time or frequency resource at the timing of switching to the second beam.

12. An integrated circuit configured for controlling a user equipment (UE), the integrated circuit comprising:

control circuitry which, in operation, monitors a first time or frequency resource for a first physical downlink control channel (PDCCH) on a first beam; and transceiver circuitry which, in operation, receives a signal initiating switching from the first beam to a second beam;

wherein the control circuitry, in operation, at a timing of switching to the second beam, switches to a second time or frequency resource to be monitored for a second PDCCH on the second beam based on the signal and an indication of the second time or frequency resource, wherein the indication of the second time or frequency resource is derived from the signal, and wherein the first and the second PDCCHs are specific to the UE or to respective groups of UEs comprising the UE.

* * * * *